United States Patent [19]

Hayes et al.

[11] Patent Number: 5,127,475

[45] Date of Patent: Jul. 7, 1992

[54] DOWNHOLE DRILLING SPOTTING FLUID COMPOSITION AND METHOD

[76] Inventors: James R. Hayes, P.O. Box 30373; Gale L. Campbell, P.O. Box 31228, both of Lafayette, La. 70593

[21] Appl. No.: 657,113

[22] Filed: Feb. 19, 1991

Related U.S. Application Data

[62] Division of Ser. No. 532,261, Jun. 1, 1990, Pat. No. 5,002,672.

[51] Int. Cl.⁵ .................. E21B 31/00; E21B 31/03
[52] U.S. Cl. ...................... 166/301; 175/65; 252/8.551
[58] Field of Search ............ 166/301, 312, 381; 175/64, 65; 252/8.551

[56] References Cited

U.S. PATENT DOCUMENTS

| | | | |
|---|---|---|---|
| 2,345,388 | 3/1944 | Ericks et al. | 260/461 |
| 2,357,497 | 9/1944 | Bond | 252/8.5 |
| 2,661,334 | 12/1953 | Lummus | 252/8.5 |
| 4,323,124 | 4/1982 | Swan | 252/8.551 X |
| 4,737,295 | 4/1988 | Cowan et al. | 252/8.551 X |
| 4,843,048 | 6/1989 | House et al. | 501/148 |
| 4,964,615 | 10/1990 | Hayes | 166/301 X |

Primary Examiner—George A. Suchfield

[57] ABSTRACT

An aqueous-based composition comprising a glycerophosphoric acid ester and a diacetyltartaric acid ester of mono and/or diglycerides when combined with viscosifier, sealant and weighting agent is suitable for use as a spotting fluid for downhole drilling operations for releasing stuck drill string. The present invention also enhances drill fluid lubricity, is nontoxic to marine life, non-polluting and may be safely disposed of in off-shore waters.

13 Claims, No Drawings

DOWNHOLE DRILLING SPOTTING FLUID COMPOSITION AND METHOD

This is a divisional of copending application Ser. No. 07/532,261 filed on June 1, 1990, U.S. Pat. No. 5,002,672.

FIELD OF THE INVENTION

The present invention relates to a spotting fluid and method for dislodging a drill string during downhole drilling operations, and more particularly to an aqueous-based spotting fluid and lubricant.

BACKGROUND OF THE INVENTION

In the art of boring into the earth with a drill string, particularly for oil and gas production, the drill string periodically becomes lodged within a subsurface formation. Failure to release the frozen drill pipe can result in an abandonment of the well. In response, spotting fluids were developed to lubricate the affected area, "spotting" referring to the placement of a quantity of drilling fluid known as a pill or slug containing a release agent at the area of concern. Furthermore, incorporating a lubricating factor into the drilling mud during ordinary operation to prevent drill pipe sticking is a common practice.

The composition of these release agents has generally consisted of various kinds of oils such as synthetic oils, vegetable oils, mineral oils, diesel oils and crude oils. Oil-based spotting fluids, however, are generally difficult to prepare because strong agitation is required to achieve an oil-water suspension taking much time when time may be a crucial consideration.

Disposal of drilling fluids containing oil components has also come under much closer environmental scrutiny and regulation concurrent with increasing concern about reducing pollutants in ground water and coastal water environs. Drilling muds containing oil are generally classified as pollutant streams having costly regulated disposal procedures. Such oils are not in the best interest of marine wild life and may leave an unsightly sheen in the water.

Accordingly, there is an urgent need for a spotting fluid release agent and lubricant in the art of oil and gas production which is nontoxic, non-oil based, inexpensive and easy to prepare and use. The Applicant has no knowledge of the prior use of an aqueous-based composition comprising glycerophosphoric acid esters and diacetyltartaric acid esters of mono and/or diglycerides in the petroleum industry as a spotting fluid and lubricant.

U.S. Pat. No. 4,876,017 discloses a composition of matter comprising a synthetic hydrocarbon compound such as a poly-α-olefin which may be combined with emulsifiers and thinners to serve as a downhole lubricant. The lubricant is said to be nontoxic to marine life. The poly-α-olefin may also function as a spotting fluid.

Preparation of glycerophosphoric acid ester in its various isomeric forms is disclosed in several articles including, Cherbuliez et al., *Helv. Chim. Acta*, vol. 29, p. 2006 (1946), Baer et al., *Journal of Biological Chemistry*, vol. 128, p. 491 (1939), and Baer et al., *Journal of Biological Chemistry*, vol. 135, p. 321 (1940).

SUMMARY OF THE INVENTION

The present invention is an aqueous-based drilling fluid composition that enhances the lubricity of a drilling fluid to prevent drill string sticking. The present invention utilized as a spotting agent reduces the time required to release a stuck pipe. By eliminating the need for oil-based components, the present invention is non-toxic to marine life, environmentally acceptable, easy to prepare, and capable of being disposed of at the drill site without costly disposal procedures.

In one embodiment the present invention comprises a spotting fluid concentrate composition suitable for use in downhole drilling operations in a pill for releasing periodically stuck drill string. The concentrate comprises a glycerophosphoric acid ester, a polyacyloxy polycarboxylic acid ester of mono and/or diglycerides, an optional viscosifying agent and an optional sealing agent dispersed and/or soluble in water.

In another embodiment, the present invention is a pill composition comprising the spotting fluid concentrate and a weighting agent for adjusting the density of the concentrate. The concentrate comprising an aqueous dispersion and/or solution of a glycerophosphoric acid ester, an optional polyacyloxy polycarboxylic acid ester of mono and/or diglycerides, an optional viscosifying agent and an optional sealing agent.

In a further embodiment, the present invention comprises a method for lubricating a downhole well drilling operation comprising the steps of: mixing a spotting fluid concentrate with a drilling mud and circulating the mud mixture through the well. The concentrate comprising an aqueous dispersion and/or solution of a glycerophosphoric acid ester, an optional polyacyloxy polycarboxylic acid ester of mono and/or diglycerides, an optional viscosifying agent and an optional sealing agent. The drilling mud comprises the concentrate in an amount of from about 1 to about 15 percent by volume of the drilling mud, preferably from about 3 to about 8 percent by volume of the drilling mud.

In yet another embodiment, the present invention comprises a method for mixing a spotting fluid pill, comprising the steps of: mixing glycerophosphoric acid ester with an aqueous dispersion of a viscosifying agent, sealing agent, and an optional polyacyloxy polycarboxylic acid ester of mono and/or diglycerides; and conditioning the aqueous dispersion with a weighting agent.

In yet a further embodiment, the present invention includes a method for releasing a stuck drill assembly in a downhole well drilling operation comprising the steps of: preparing a pill of a spotting fluid composition; displacing a drilling fluid in the well with the pill in an amount sufficient to contact the well bore with the pill adjacent the location of the sticking; displacing the drilling fluid with an additional quantity of the pill until the drill assembly is free to move; and circulating the drilling fluid to incorporate the pill into the fluid. The pill composition comprises an aqueous mixture of a glycerophosphoric acid ester, an optional polyacyloxy polycarboxylic acid ester of mono and/or diglycerides, an optional viscosifying agent, an optional sealing agent and a weighting agent. The method may also include vertically working the drill assembly during the initial displacing step; and further removing the drill assembly prior to the circulating step and staging back into the well with the freed drill assembly.

The invention generally comprises the glycerophosphoric acid ester in the concentrate in an amount of from about 1 to about 60 percent by weight of the concentrate, preferably from about 10 to about 32 percent by weight of the concentrate and optimally from about 18.5 to about 24.5 percent by weight of the concentrate.

DETAILED DESCRIPTION OF THE PREFERRED EMBODIMENTS

An embodiment of the present invention comprises an aqueous-based spotting fluid concentrate which is nontoxic to marine life, and absent any oil components, is acceptable to water environments, particularly the coastal waters around off-shore drilling operations. In another embodiment, a spotting fluid pill prepared therefrom enhances the lubricity of drilling fluids and effectively frees stuck drill string. Furthermore, the present invention is easy to prepare and cost effective to use.

In particular, the preferred embodiment of the present invention comprises a water solution of a glycerophosphoric acid ester and a diacetyltartaric acid ester of mono and/or diglycerides to obtain a general purpose spotting fluid concentrate. To this concentrate there may be added, a viscosifier, a sealant and a weighting agent in order to design a pill specifically conditioned to the drilling operation at hand.

The first component of the present invention is glycerophosphoric acid ester which may be prepared, for example, as the reaction product of glycerin and phosphoric acid. Glycerophosphoric acid ester constitutes a mud cake dehydrating agent and is the primary component responsible for reducing the adhesion of a mud cake upon the frozen drill string. Glycerophosphoric acid ester typically comprises from about 1 to about 60 percent by weight of the concentrate preferably from about 10 to about 32 percent by weight of the concentrate and optimally from about 18.5 to about 24.5 percent by weight of the concentrate composition of the present invention.

A second component of the concentrate is a reaction product of (a) a mono and/or diglyceride with (b) a polyacyloxy polycarboxylic acid. The mono and/or diglyceride is generally an ester of a fatty acid of up to about 32 carbon atoms with glycerol. The polyacyloxy polycarboxylic acid reactant comprises at least diacyloxy and dicarboxylic acid functionality along a hydrocarbon backbone of from 4 to about 18 carbon atoms, preferably from 4 to about 6 carbon atoms. Each acyloxy radical generally comprises up to about 16 carbon atoms, preferably up to about 10 carbon atoms, and more preferably up to about 6 carbon atoms. Acyloxy functional groups may be the same or different along the hydrocarbon backbone. An especially preferred polyacyloxy polycarboxylic acid is diacetyltartaric acid. The diacetyltartaric acid, for example, reacts with a remaining hydroxy group on the mono and/or diglyceride in a condensation reaction. The reaction product of diacetyltartaric acid with a mono and/or diglyceride (DATEM) is a preferred compound. DATEM is commercially available, for example, from Grinsted Products, Inc. or Grinsted AG under the tradename PANODAN SD or PANODAN TR. DATEM is a primary lubricating ingredient in the concentrate reducing friction and adhesive tendencies between the drill string and a wellbore or steel casing.

DATEM typically comprises from 0 to about 25 percent by weight of the concentrate composition, preferably from about 0.5 to about 20 percent by weight and optimally from about 0.8 to about 3.5 percent by weight of the concentrate composition of the present invention.

Additional components may include viscosifying and sealing agents as well as minor quantities of other additives having different purposes such as balancing pH, thinning, defoaming and the like. These components are well known in the arts.

The purpose of the viscosifying agent is to enable a solid weighting material to be suspended in the spotting fluid mixture. Suitable viscosifying agents include marine plant gum, terrestrial plant gum, microbial polysaccharide gum and other polysaccharide gum derivatives. Viscosifying agents are available under the trade names KELCO XC, XCD, XANVIS, BIOZAN, and the like. The viscosifying agent typically comprises from 0 to about 8 percent by weight of the concentrate, preferably from about 0.1 to about 5 percent by weight and optimally from about 0. percent by weight of the spotting fluid concentrate.

The addition of a sealing agent may be made in order to provide a solid particle barrier to transference of fluids from the wellbore into a permeable low pressure formation. Such loss of fluids and wellbore pressure may cause a sticking situation. Examples of sealing agents include gilsonite, water dispersible asphalt, calcium carbonate, vegetable fiber and the like. The sealing agent typically comprises from 0 to about 10 percent by weight of the concentrate, preferably from about 2 to about 8 percent by weight and optimally from about 4 to about 7 percent by weight of the concentrate.

The remainder of the spotting fluid concentrate comprises a diluent which is preferably fresh water or sea water.

Another embodiment of the present invention comprises spotting fluid pill formulated utilizing the spotting fluid concentrate conditioned by a weighting agent. Examples of weighting agents include barite, hematite, calcium carbonate, and the like. Conditioning criteria include density, viscosity, water loss at both ambient and downhole pressure and temperature, thickness of the cake, and other physical qualities important in drilling operations and well known in the drilling arts. Matching the physical characteristics of the drilling mud for any given well is an important criterion for spotting the pill at a specific wellbore location. Density of the pill is a particularly important factor.

TABLE I

| COMPONENTS OF A ONE BARREL (42 gal) MIX | | |
|---|---|---|
| DENSITY (lb/gal) | SPOTTING FLUID CONCENTRATE (bbls) | BARITE (lbs) |
| 8.8 | 1.000 | 0.00 |
| 9.0 | 0.993 | 11.16 |
| 10.0 | 0.974 | 39.06 |
| 10.5 | 0.936 | 94.87 |
| 11.0 | 0.918 | 122.77 |
| 11.5 | 0.899 | 150.67 |
| 12.0 | 0.880 | 178.58 |
| 12.5 | 0.861 | 206.48 |
| 13.0 | 0.843 | 234.38 |
| 13.5 | 0.824 | 262.28 |
| 14.0 | 0.805 | 290.19 |
| 14.5 | 0.787 | 318.09 |
| 15.0 | 0.768 | 345.99 |
| 15.5 | 0.749 | 373.90 |
| 16.0 | 0.730 | 401.80 |
| 16.5 | 0.712 | 429.70 |
| 17.0 | 0.693 | 457.60 |
| 17.5 | 0.674 | 485.51 |
| 18.0 | 0.655 | 513.41 |

The concentration of weighting agent required is generally determined based upon conditioning criteria mentioned above. Table I shows the approximate weight of a common weighting agent, such as barite, required to achieve a stated density in the concentrate of the present invention.

Components of the present invention are preferably freshly mixed prior to use in a large vessel or a clean mixing pit. Advance preparation is discouraged because glycerophosphoric acid ester is hydroscopic. However, conditioning criteria should be determined in advance so that a pill may be prepared without a time delay when needed.

In a preferred manner of practicing the present invention, the glycerophosphoric acid ester component is prepared in a reaction vessel from a slow addition of glycerin to a phosphoric acid. In situ preparation of glycerophosphoric acid ester may be less costly than obtaining a prepared reagent.

The glycerophosphoric acid ester is added to an aqueous dispersion and/or solution of DATEM and viscosifier followed by sealing and weighting agents.

Phosphoric acid is known in the art to have oligomeric structures of the formula $H_{n+2}P_nO_{3n+1}$ where $n<1$. Examples include orthophosphoric acid $H_3PO_4$ (n=1), pyrophosphoric acid (n=2) and the like. Any phosphoric acid is suitable for practicing the present invention. Widely available and preferred in a compound known as polyphosphoric acid 115 which comprises a mixture of orthophosphoric acid with higher acids and is sold on the basis of calculated $H_3PO_4$ content, e.g. 115 percent by weight.

Polyphosphoric acid 115, for example, is combined with glycerin in a stoichometric ratio of about 2:1 of glycerin:polyphosphoric acid 115. This reaction is exothermic and should be undertaken in a suitable reaction vessel by a slow addition of acid into the glycerin so that the reaction temperature preferably does not exceed 160° F. to 170° F. If the addition is too fast, longer cooling time may be required. The reaction time is typically two hours with an additional hour cooling before use. End of the reaction is indicated by the reaction effluent temperature falling by approximately 20° F.

To prepare a pill, a mixing pit or tank is preferably cleaned to avoid unnecessary contamination. Clean water is pumped through the mixing manifolds to flush out all the residual drilling mud. Waste water is dumped from the tank and lines. Spotting fluid concentrate and barite or other weighting agent are then mixed in the desired proportions. The sealing agent is added typically through a mixing hopper concurrent with the weighting agent for the desired density pill. (The effect of sealing agent on density as shown in Table I is generally negligible for all density entries). The hopper discharge is halted and agitated into a smooth fluid.

When it becomes necessary to release a stuck drill string and time is critical, a spotting fluid pill comprising the aqueous-based concentrate suitably conditioned is prepared. The finished spotting fluid should be pumped down the drill string into the open hole in sufficient quantity to immerse the entire annular interval affected. The pill should be delivered within 3 to 5 hours for best results. The affected region is typically soaked with the fluid for a time period of from approximately 1 to 48 hours, preferably 6 to 30 hours and more preferably 18 to 24 hours. An additional quantity of fluid should be pumped periodically to insure adequate soaking and the string should be worked vertically. Generally, an additional 0.5 to 5 barrels of fluid are pumped per hour, preferably an additional 1 to 1.5 barrels of fluid are pumped, and optimally about 1 barrel is pumped per hour. When the pipe is free, it is pulled up from the problem zone leaving the spotting fluid to lubricate and seal the low pressure sand formation. The drill string is staged back into the hole and the drilling fluid is circulated to incorporate the spotting fluid pill as lubricant on the mud. The mud may be further conditioned with alkalinity control agent, thinner, defoamer and the like as needed.

In another embodiment, the present invention comprises drilling mud preferably incorporating the spotting fluid concentrate in an amount of from about 1 to about 8 percent by volume of the drilling mud, generally in an amount of from about 0.1 to about 25 percent by volume of the drilling mud. As a lubricating fluid, the present invention reduces the prevalence of drill string sticking. To prepare a lubricating fluid, an aqueous solution of glycerophosphoric acid ester, DATEM, and viscosifying agent is formulated. Component concentrations are the same as mentioned previously. The lubricating fluid is blended into the drilling mud, i.e. circulated in the wellbore during drilling.

The present invention is further illustrated by the following examples.

EXAMPLE 1

A spotting fluid pill was prepared by initially formulating the aqueous-based spotting fluid concentrate which is an embodiment of the present invention. A 100 barrel (about 4200 gallons) batch of concentrate was formulated by slowly adding 1750.8 lbs of polyphosphoric acid 115 to 3440.25 lbs of glycerin in a suitably large vessel under constant stirring. An exothermic reaction began which raised the temperature to about 160° F. to 170° F. Approximately 2 hours was required to fully react the polyphosphoric acid 115 and glycerin and completion of the reaction was indicated by reaction mixture temperature cooling by 20° F. or more. Concurrent with the reaction to produce the glycerophosphoric acid ester, 130 lbs of a polymer viscosifier known as KELCO XC, which is a xantham gum, was dissolved in 3736.5 gallons of fresh water. Then 295 lbs of DATEM lubricant was added and stirred into solution. The glycerophosphoric acid ester reaction product was then added to the solution of water viscosifier and DATEM and stirred to produce the finished spotting fluid concentrate. To complete the pill, barite was added together with a water dispersible asphalt sealing agent. The concentration of sealing agent was 15 lb/bbl concentrate (approximately 4 percent by weight of the concentrate).

EXAMPLE 2

A pill was formulated as in Example 1 to test its effects on a stuck drill string in a well off the coast of Louisiana. The finished formulated pill, was pumped into the drill string to displace the drilling mud already there whereby the region of sticking was adequately soaked. The pill released the drill string after 2.5 hours of soaking.

EXAMPLE 3

To the same well as in Example 2, the spotting fluid concentrate of the present invention was blended into the drilling mud for use as a lubricating agent. Beginning with unlubricated mud and then blending the present invention to about 4 percent by volume, change in lubricity in terms of amps required for drilling was measured. Amp readings were reduced from approximately 650 with the unlubricated mud to about 500 with the mud having 4 percent by volume of the present invention. Concentrate composition comprised an aqueous solution of 21.1 percent by weight glycerophosphoric acid ester, 1.2 percent by weight DATEM and 0.4 percent by weight viscosifier.

EXAMPLE 4

A sheen test was performed on a sample of spotting aqueous solution fluid concentrate of the present invention. The composition comprised 21.1 percent by weight glycerophosphoric acid ester, 1.2 percent by weight DATEM, and 0.4 percent by weight viscosifying agent in an aqueous solution. The test was performed according to the test procedures as recited by the Code of Federal Regulations, 40 CFR part 435 of August 26, 1985. In that procedure, a pan having a black liner was filled with reconstituted sea water. Both a 0.15 gram sample and a 15 gram sample of the concentrate was placed on the surface of the water and gently stirred. The components of the concentrate were allowed to diffuse through the pan of water for about 10 minutes, then a visual observation for an oil sheen was made. No sheen was observed for either the 0.15 gram or the 15 gram sample.

EXAMPLE 5

To the concentrate solution of Example 4, a water dispersible asphalt sealing agent was added to a concentration of about 4 percent by weight (15 lb/bbl concentrate). Further sheen tests were run according to the procedures of Example 4 and no sheen was observed for both the 0.15 gram and the 15 gram sample.

EXAMPLE 6-7

Toxicity tests were conducted to determine a 50 percent lethal concentration for a drilling mud including two different concentrations of the spotting fluid concentrate of the present invention. Drilling mud comprised 11.3 lb/gal density lignosulfonate mud called generic mud #7. The concentrate comprised an aqueous solution of 21.1 percent by weight glycerophosphoric acid ester, 1.2 percent by weight DATEM, and 0.4 percent by weight viscosifier. The procedures followed are those recited in a EPA study entitled "Drilling Fluid Toxicity Tests", Federal Vol. 50, No. 165, August 26, 1985.

A 10 percent by volume concentration of the test drilling mud was prepared in reconstituted sea water having a chloride concentration of 20 parts per thousand. The pH was adjusted with diluted hydrochloric acid or dilute sodium hydroxide solution. Both pH and chloride concentration were monitored and held constant throughout the 96 hour test period. One hour after preparing the 10 percent by volume solution, the suspended particle phase (SPP) was decanted. This phase had a milky chocolate appearance. The SPP was further diluted with sea water to form five different solutions having progressively increasing concentration of the SPP. A control sample containing just reconstituted sea water was also tested. Three repetitions for each SPP concentration were made and the test results are shown in Table II. Twenty shrimp known as *Mysidoosis bahia* were added to each concentration and repetition for a total of 360 test animals including the control.

A standard of $LC_{50}$ toxicity of no greater than 30,000 ppm for discharging drilling mud at the drill site is generally required. Drilling mud having 3 and 6 percent by volume composition of the spotting fluid concentrate of the present invention easily passed this standard with an $LC_{50}$ varying between about 750,000 ppm to about 830,000 ppm of the suspended particle phase.

TABLE II

| EXAMPLE | CONC. PRODUCT (vol. %) | MUD DENSITY | CONC. SPP. (ppm) | MYSIDS EXPOSED | SURVIVED |
|---|---|---|---|---|---|
| 6 | 3 | 11.4 | 30,000 | 60 | 0 |
|   |   |   | 250,000 | 60 | 2 |
|   |   |   | 500,000 | 60 | 5 |
|   |   |   | 750,000 | 60 | 22 |
|   |   |   | 1,000,000 | 60 | 44 |
|   |   |   | Control | 60 | 1 |
| 7 | 6 | 11.4 | 30,000 | 60 | 2 |
|   |   |   | 250,000 | 60 | 5 |
|   |   |   | 500,000 | 60 | 12 |
|   |   |   | 750,000 | 60 | 30 |
|   |   |   | 1,000,000 | 60 | 47 |
|   |   |   | Control | 60 | 1 |
| 8 | 10 |   | 50,000 | 20 | 20 |
|   |   |   | Control | 20 | 19 |

EXAMPLE 8

Further toxicity tests were run according the procedure outlined in Examples 6–7, however, the concentration of spotting fluid formulation in the generic drilling fluid #7 was increased to about 10 percent by volume and water dispersible asphalt sealing agent was added at a rate of 15 lb/bbl concentrate. The suspended particle phase of the 10 percent by volume fluid was diluted 1:9 with artificial sea water which was again diluted 1:2. Twenty mysids were exposed to both the control and the diluted SPP for a period of 24 hours. Nineteen of the 20 animals survived in the control tests and all 20 survived in the diluted SPP test (see Table II).

EXAMPLES 9-12

Lubricity testing was performed on several types of drilling mud both with and without a 6 percent by volume spotting fluid concentrate of the present invention. The concentrate composition comprised 21.1 percent by weight glycerophosphoric acid ester, 1.2 percent by weight DATEM, and 0.4 percent by weight viscosifier in an aqueous solution. Other components included a water dispersible asphalt in a concentration of 15 lb asphalt per barrel concentrate. The test procedure is known as the Baroid EP lubricity test and the procedure is as follows:

A sample to be tested was placed in the Baroid test equipment comprising a motor rotating a sleeve in the sample to be tested at fixed rpms and a means for applying a known amount of torque perpendicular to the rotating sleeve. Typically, the torque applying means comprised a wood block fitted against the rotating sleeve on one side and a torque applying wrench on the other. Prior to testing, all the samples were hot rolled in an oven at 200° F. for three hours to simulate temperature changes that might occur downhole. The amps required to rotate the sleeve in the mud at a given rpm and a varying degree of torque pressure was recorded. The lubricity coefficient is a ratio of the amps required to the given torque. Results in Table III indicate significant reduction in the amps required to rotate the sleeve and therefore an increase in lubricity in those mud samples comprising 6 percent by weight spotting fluid concentrate.

TABLE III

| EXAMPLE | CONC. PRODUCT (vol. %) | MUD DENSITY (lb/gal) | TYPE | TORQUE (ft-lb) | MOTOR AMPS | % REDUCTION |
|---|---|---|---|---|---|---|
| 9 | 0 | 12.3 | Lignosulfonate | 100 | 12 | |
| | | | | 200 | 32 | |
| | | | | 300 | 43 | |
| | | | | 400 | >50 | |
| | | | | 500 | >50 | |
| | | | | 600 | >50 | |
| | 6 | 12.3 | Lignosulfonate | 100 | 11.5 | 4.2 |
| | | | | 200 | 28.5 | 10.9 |
| | | | | 300 | 38.5 | 10.5 |
| | | | | 400 | 48 | — |
| | | | | 500 | >50 | — |
| | | | | 600 | >50 | — |
| 10 | 0 | 12.5 | Gypsum | 100 | 12 | |
| | | | | 200 | 24 | |
| | | | | 300 | 43 | |
| | | | | 400 | >50 | |
| | | | | 500 | >50 | |
| | | | | 600 | >50 | |
| | 6 | 12.5 | Gypsum | 100 | 10 | 16.7 |
| | | | | 200 | 21 | 12.5 |
| | | | | 300 | 40 | 7.0 |
| | | | | 400 | 49 | — |
| | | | | 500 | >50 | — |
| | | | | 600 | >50 | — |
| 11 | 0 | 12.5 | High lime | 100 | 10 | |
| | | | | 200 | 23 | |
| | | | | 300 | 48 | |
| | | | | 400 | 750 | |
| | | | | 500 | >50 | |
| | | | | 600 | >50 | |
| | 6 | 12.5 | High lime | 100 | 9 | 10.0 |
| | | | | 200 | 20 | 13.0 |
| | | | | 300 | 22 | 12.5 |
| | | | | 400 | >50 | — |
| | | | | 500 | >50 | — |
| | | | | 600 | >50 | — |
| 12 | 0 | 12.6 | TEK-mud | 100 | 10 | |
| | | | | 200 | 21 | |
| | | | | 300 | 38 | |
| | | | | 400 | >50 | |
| | | | | 500 | >50 | |
| | | | | 600 | >50 | |
| | 6 | 12.6 | TEK-mud | 100 | 9 | 10 |
| | | | | 200 | 21 | 0 |
| | | | | 300 | 31 | 18.4 |
| | | | | 400 | >50 | — |
| | | | | 500 | >50 | — |
| | | | | 600 | >50 | — |

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

We claim:

1. A method for releasing a stuck drill pipe assembly in a downhole well drilling operation comprising the steps of:

(a) preparing a pill of an aqueous spotting fluid dispersion comprising a water soluble glycerophosphoric acid ester prepared as the reaction product of glycerin and phosphoric acid, an optional polyacyloxy polycarboxylic acid ester of monoglycerides, diglycerides and mixture thereof, an optional viscosifying agent, an optional sealing agent and a weighting agent;

(b) displacing a drilling fluid in said well with said pill in an amount sufficient to contact the wellbore with said pill adjacent the location of sticking;

(c) displacing said drilling fluid with an additional quantity of said pill until said drill assembly is free to move; and (d) circulating said drilling fluid to incorporate said pill into said fluid.

2. The method of claim 1, wherein said method further comprises working said drill assembly vertically during the initial displacing step; and further removing said drill assembly prior to said circulating step, and staging back into said well with said freed drill assembly.

3. The method of claim 1, wherein said pill comprises said glycerophosphoric acid ester in an amount of from about 1 to about 60 percent by weight of said pill.

4. The method of claim 1, wherein said pill comprises said glycerophosphoric acid ester in an amount of from about 10 to about 32 percent by weight of said pill.

5. The method of claim 1, wherein said pill comprises said glycerophosphoric acid ester in an amount of from about 18.5 to about 24.5 percent by weight of said pill.

6. The method of claim 1, wherein said pill comprises said polyacyloxy polycarboxylic acid ester of monoglycerides, diglycerides and mixtures thereof in an amount of from about 0.8 to about 3.5 percent by weight of said pill.

7. The method of claim 1, wherein said polyacyloxy polycarboxylic acid comprises diacetyltartaric acid.

8. The method of claim 1, wherein said pill comprises said viscosifying agent in an amount of from 0 to about 5 percent by weight of said pill.

9. The method of claim 1, wherein said pill comprises said sealing agent in an amount of from 0 to about 8 percent by weight of said pill.

10. The method of claim 1, wherein said weighting agent comprises barite or hematite.

11. The method of claim 1, wherein said drilling fluid comprises said spotting fluid pill in an amount of from about 1 to about 15 percent by volume of said drilling mud.

12. The method of claim 1, wherein said drilling fluid comprises said spotting fluid pill in an amount of from about 3 to about 8 percent by volume of said drilling mud.

13. The method of claim 1, wherein said glycerophosphoric acid ester comprises the reaction product of about 2 moles of glycerin per mole of phosphoric acid.

* * * * *